Aug. 11, 1959  A. L. VANDERGRIFF  2,898,635
HULL EXTRACTOR FOR SEED COTTON
Filed Sept. 10, 1953  3 Sheets-Sheet 1

INVENTOR.
ARVEL L. VANDERGRIFF
BY
Jennings & Carter
ATTORNEYS

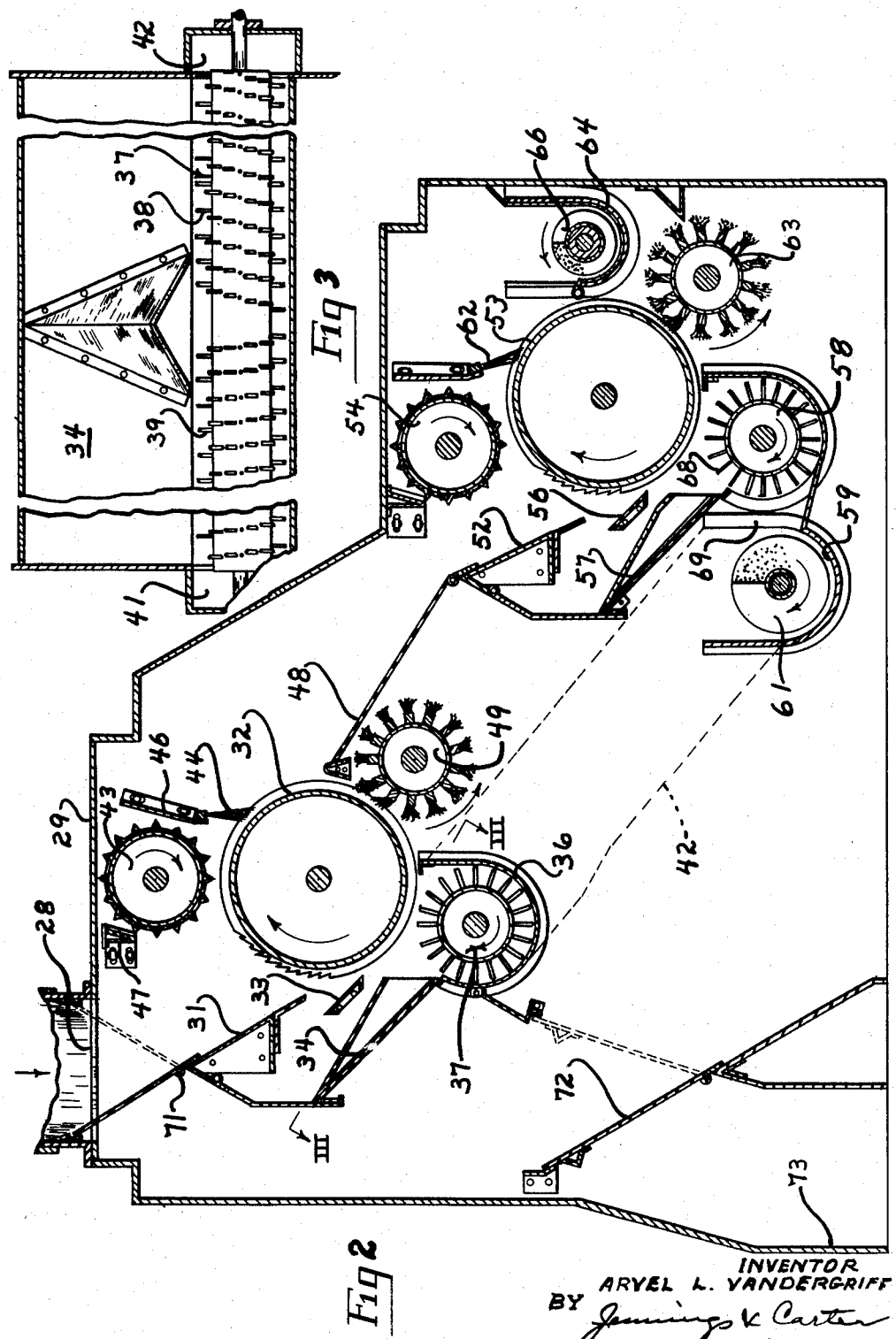

Aug. 11, 1959   A. L. VANDERGRIFF   2,898,635
HULL EXTRACTOR FOR SEED COTTON
Filed Sept. 10, 1953   3 Sheets-Sheet 3
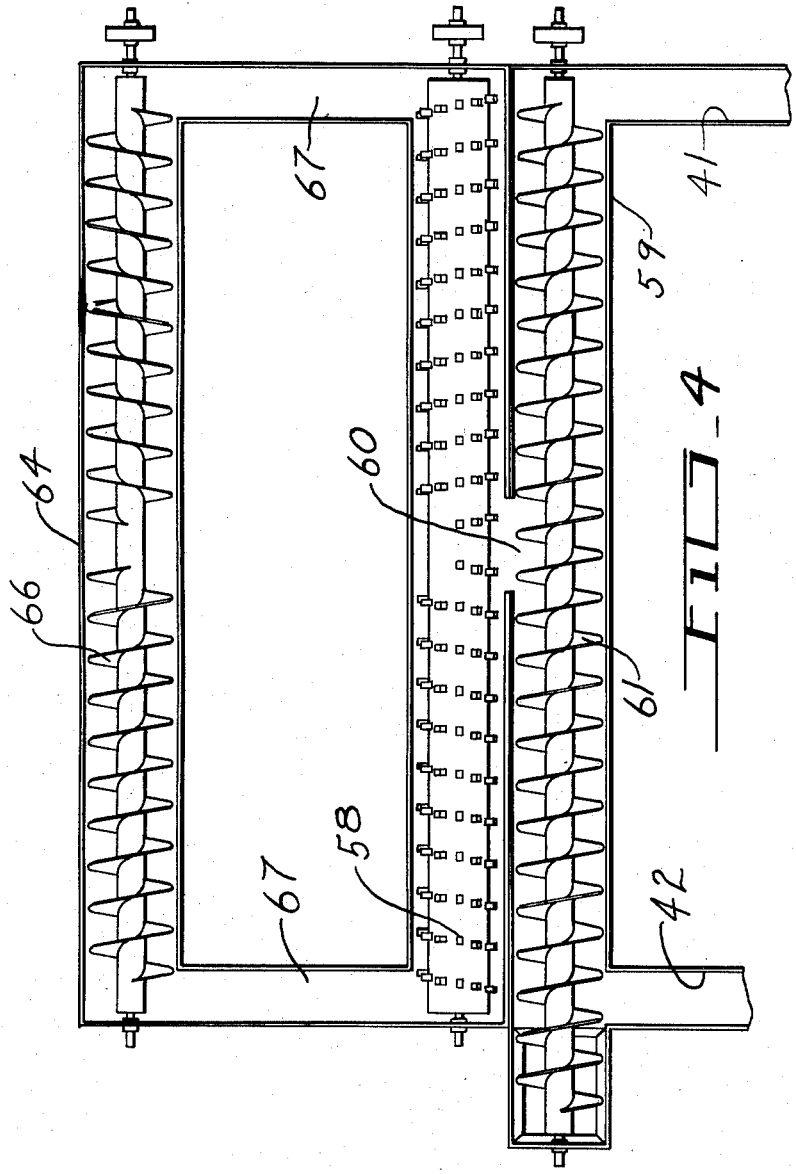
INVENTOR.
ARVEL L. VANDERGRIFF
BY
Jennings + Carter
ATTORNEYS

United States Patent Office 2,898,635
Patented Aug. 11, 1959

2,898,635

HULL EXTRACTOR FOR SEED COTTON

Arvel L. Vandergriff, Columbus, Ga., assignor to Lummus Cotton Gin Company, a corporation of Georgia Application September 10, 1953, Serial No. 379,416

2 Claims. (Cl. 19—37)

This invention relates to apparatus for extracting sticks, hulls and other foreign material from seed cotton. Present day methods of harvesting seed cotton include machine picking, sledding, and snapping the bolls, all of which causes the gathering of a large amount of foreign materials with the cotton. Such foreign materials may comprise from 40% to 65% of the total weight of the mixture, and its separation from the seed cotton so as to provide a clean sample has become a major problem in the processing of cotton.

Heretofore in this art it has been considered necessary to break the sticks, hulls and other foreign materials in the seed cotton into sufficiently small particles that they could be screened out of the cotton. This method of treatment requires drastic treatment of the cotton and results in injury to the fibers. Furthermore the fine, dust-like particles resulting from the breaking of the larger particles, cling to the lint and are very difficult to separate, resulting in a dirty sample. In the operation of cleaning machines of the general type with which I have heretofore been familiar, where the stick and hull content of the seed cotton comprised around 40% by weight of the whole, it has been possible to reduce this to only around 15% to 20%. It is accordingly an important object of my invention to provide an extractor which shall be effective to separate hulls, sticks and other like foreign material from seed cotton without the necessity of breaking and screening the foreign material into small particles for screening.

A further object of my invention is to provide apparatus which shall combine a screening and centrifugal separation and in which fine loose particles are screened out of the cotton and the larger sticks and hulls are separated by centrifugal force.

It has been my observation that sticks, hulls and the like in seed cotton do not cling to the teeth of the cleaning saw cylinder employed with hull extractors, but that they are held by the cotton fibers, which in turn cling to the saw teeth. In order to take advantage of this fact, I have provided apparatus in which the sticks, hulls and the like are thrown off the saw cylinder by centrifugal force while a large portion of the cotton is retained on the saw cylinder. By repeating the operation the foreign material content of the cotton may be reduced to from 3% to 4%.

In accordance with my invention the seed cotton passes through a preliminary cleaner, including a boll breaker, in which the bolls and sticks are broken to a size where they may be separated from the cotton, and the loose dirt and trash is screened out. The cotton then passes to a toothed cleaning cylinder equipped with a hull board and a stripper roller such as described in my copending application Serial No. 37,564, filed July 8, 1948, now Patent No. 2,668,989. The cotton clinging to the saw teeth, together with some hulls and sticks, passes under the stripper roller and then under a wire brush bearing against the saw cylinder and inclined in the direction of rotation of the saw cylinder. The brush presses the cotton down and distributes it over the saw teeth and aids in freeing the sticks and hulls which are then thrown off by centrifugal force from the saw cylinder and may pass to another similar unit for further processing. Hulls thrown back by the stripper roller pass to a reclaiming unit as described in my previously filed application aforesaid while those passing to the succeeding unit are finally discharged after further processing.

Apparatus embodying features of my invention is illustrated in the accompanying drawings, forming a part of this application, in which—

Fig. 2 is a detailed sectional view showing the principal features of my invention;

Fig. 3 is a sectional view of one of the spiked reclaiming cylinders taken along the line III—III of Fig. 2; and Fig. 4 is a diagrammatic sectional plan view showing the direction of movement of material thrown off by one of the saw cylinders, the saw cylinder being omitted.

Figure 1:
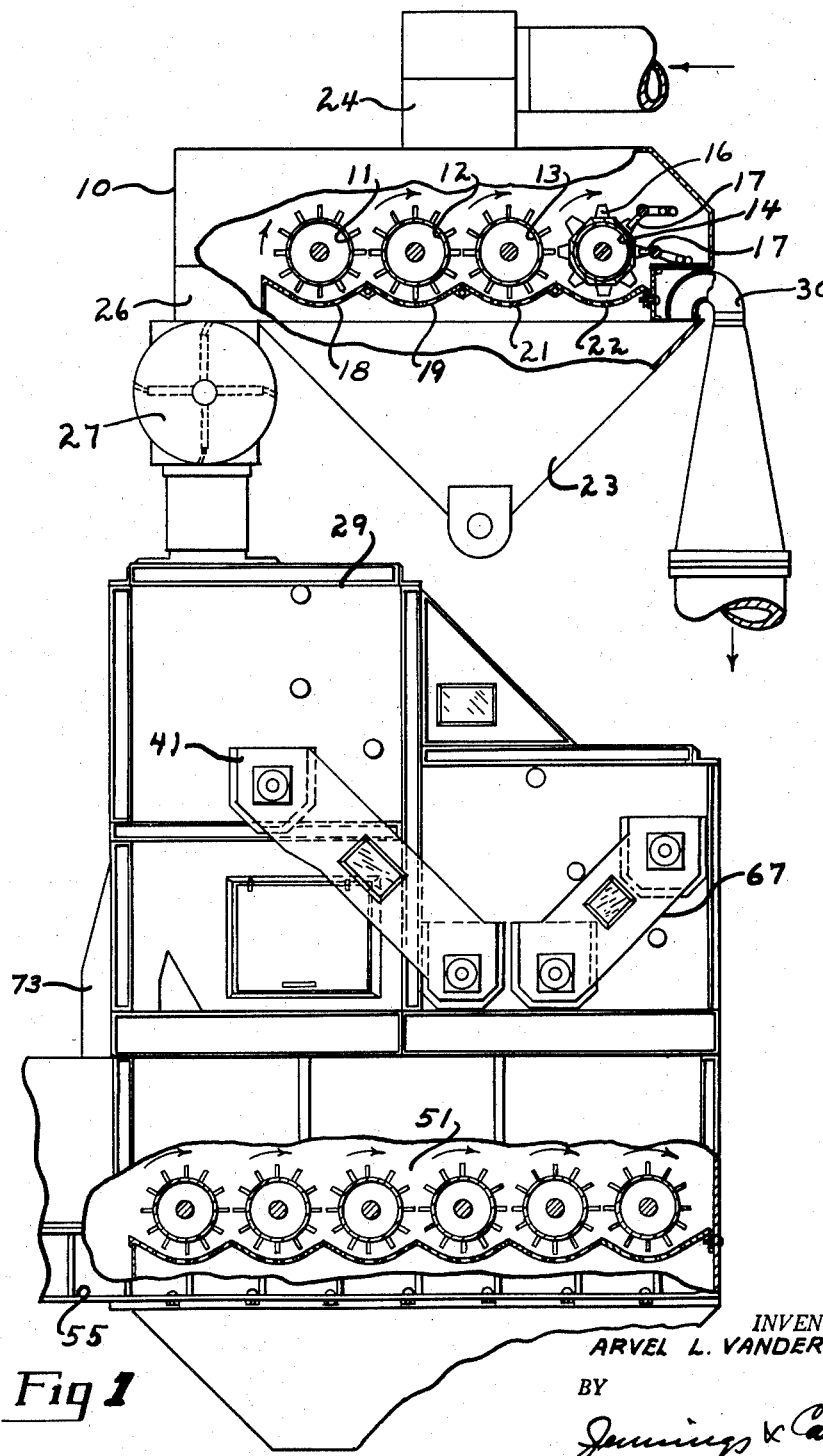
Fig. 1 is an elevational view of the apparatus with parts broken away and in section.

Referring to the drawings for a better understanding of my invention, I show in Fig. 1 a seed cotton cleaner embodying a casing 10 in which are mounted a plurality of spiked rollers 11, 12 and 13, and a boll breaker cylinder 14. The boll breaker cylinder 14 is provided with spiked teeth 16 which cooperate with similar stationary teeth 17 mounted in the casing to break the cotton bolls and sticks which are gathered with the seed cotton. The spiked rollers 11, 12, and 13, and the boll breaker roller 14 all rotate in the directions indicated by the arrows and are mounted above cooperating screens 18, 19, 21 and 22 through which loose dirt and trash pass downwardly into a hopper 23 from which it is discharged. Seed cotton together with heated air, if necessary to dry the cotton, is fed into the casing 10, above the spiked rollers, through a conduit 24. Cotton is delivered from the cleaner just described into a conduit 26 and is fed by a sealed dropper 27 through an opening 28 into the casing 29 of my improved extracting apparatus. The heated air passes out of the casing 10 through a conduit 30.

Cotton entering the casing 29 through the opening 28 containing the broken bolls and sticks moves down an inclined slide 31 to engage the upgoing side of a cleaning saw cylinder 32. Mounted below the lower end of the slide 31 is a hull board 33 with its lower end closely adjacent the saw cylinder 32 whereby the hulls and sticks are held close to the saw cylinder for engagement of the cotton by the teeth of the saw cylinder. Hulls and sticks engaged by the teeth of the saw cylinder may be thrown over the upper edge of the hull board 33 onto a slide 34 which delivers them into the trough 36 of a spiked reclaiming cylinder 37. The reclaiming cylinder 37 rotates in the direction indicated by the arrow in Fig. 2 and throws the hulls and sticks up against the saw cylinder 32 so that any cotton remaining with the hulls and sticks is picked up by the cylinder 32, all as described in my previously filed application aforesaid.

The reclaiming cylinder 37 is provided with spikes arranged in spiral rows 38 and 39, as shown in Fig. 3 of the drawing with the rows inclined in opposite directions, from the middle of the roller, as shown in Fig. 3, whereby the hulls and sticks are discharged at opposite ends of the roller into chutes 41 and 42 for final discharge from the machine in a manner to be described later.

Mounted over the saw cylinder 32 is a stripper roller 43 which rotates in the direction indicated by the arrow so that the lower surface rotates in a direction opposite to that of the upper surface of the saw cylinder 32, whereby hulls and sticks clinging to the cotton on the teeth of the saw cylinder 32 may be knocked back to fall downwardly onto the hull board 33 for further treatment. The cotton on the saw cylinder 32, together with a portion of the hulls and sticks clinging thereto, passes the stripper roller 43 and is next engaged by a downwardly extending wire brush 44. The brush 44, as shown in Fig. 2 of the drawing, is mounted at the lower end of a plate 46 which is mounted in front of the stripper roller 43. Also mounted adjacent the opposite side of the stripper roller 43 is a bar 47 disposed to engage hulls or sticks which might cling to the stripper roller 43 and causes them to fall downwardly against the saw cylinder 32.

The brush 44, as shown in Fig. 2, has its bristles inclined in the direction of rotation of the saw cylinder 32 and presses downwardly against the saw cylinder. I have found that this serves to distribute the cotton evenly on the saw cylinder and to press the cotton clinging to the teeth more tightly against the saw cylinder while aiding to disengage the sticks and hulls clinging to the seed cotton. These sticks and hulls are then thrown off the saw cylinder by centrifugal force and fall upon a downwardly inclined slide 48. Where my improved apparatus is being run at low capacity, as when feeding directly to a gin, the wire brush 44 may be dispensed with. Also, by providing a sufficient number of saw cylinders in series, as hereinafter described, good results may be obtained without the brush 44. I have found however that the provision of the brush 44, as herein described, affords a high capacity apparatus with a minimum of units.

Mounted adjacent the lower side of the saw cylinder 32, below the slide 48, is a doffing brush 49 which rotates in the direction indicated by the arrow to remove cotton from the teeth of the saw cylinder 32. The doffed cotton falls downwardly through the casing 29 where it may pass over a series of spiked rolls and screens indicated generally by the numeral 51 for the final removement of dirt and trash.

At the lower end of the slide 48 is a second slide 52 which delivers the hulls, sticks and cotton intermingled therewith against the upgoing side of a second saw cylinder 53, similar to the saw cylinder 32. The saw cylinder 53 has associated therewith a stripper roller 54, a hull board 56, a hull slide 57, and a spiked reclaiming cylinder 58, all being similar and similarly arranged to those associated with the saw cylinder 32. The spiked reclaiming cylinder 58, after treatment of the hulls and sticks therein, delivers them at 60 into the trough 59 of a screw conveyor 61 which delivers the hulls and sticks out of the casing as shown at 65 in Fig. 4.

Mounted over the saw cylinder 53, adjacent the stripper roller 54, is a second wire brush 62 which presses against the saw cylinder and functions in a manner identical to that already described with respect to the wire brush 44. A doffing brush 63 is mounted adjacent the lower side of the saw cylinder 53 in a position to remove cotton from the saw cylinder which passes the wire brush 62.

Hulls and sticks passing the wire brush 62 are thrown off by centrifugal force into the trough 64 of a screw conveyor 66. The screw conveyor 66 delivers the hulls and sticks into a chute 67 at each end thereof (only one being shown) for delivery to the spiked reclaiming cylinder 58. As already described, the spiked reclaiming cylinder 58 delivers the hulls and sticks into the conveyor trough 59 for final disposal. It will be understood that the spikes 68 on the reclaiming cylinder 58 are disposed to convey the hulls and sticks from the ends toward the middle, rather than from the middle toward the ends as does the reclaiming cyilnder 37, and delivers these hulls and sticks through an opening 69 in the side of the conveyor trough 59.

In case the cotton does not contain bolls and sticks which would require treatment with my improved apparatus, I provide means whereby it may be by-passed to be fed directly into a gin. The upper end of the slide 31 is hinged at 71 whereby it may be turned to the dotted position indicated so that the cotton will fall down rearwardly of the saw cylinder 32. Also, at the lower end of the casing 29 is a hinged slide 72 which may be turned to the dotted position indicated to cause the cotton to fall down through a chute 73 from which it may be delivered directly to the gin. If left in the full line position shown, the cotton would pass to the cleaning cylinders 51 for screening treatment before being fed to the gin.

From the foregoing description, the operation of my improved apparatus will be readily understood. Cotton which may have been harvested mechanically so as to contain a large proportion of sticks and bolls passes into the cleaner casing 10 from the conduit 24 and vacuum feeder 27 into the casing 29 of my improved extracting apparatus. Hot air brought into the casing 10 with the cotton is delivered from the casing 10 through the conduit 30.

The seed cotton, together with the broken bolls and sticks passes down the slide 31 to the upgoing side of saw cylinder 32 and is stopped in its downward movement by the hull board 33. The cotton is picked up by the teeth of the saw 32 and carried under the stripper roller 43 where some of the hulls and sticks are engaged by the stripper roller and are thrown back and fall downwardly against the hull board 33. Free hulls and sticks engaged by the teeth of the saw cylinder 32 are thrown over the hull board 33 onto the slide 34 and move downwardly into the trough 36 of the reclaiming cylinder 37. Cotton with hulls and sticks clinging thereto and passing the stripper roller 43, passes under the bristles of the wire brush 44 which presses the cotton into tighter engagement with the teeth of the saw 32 and aids in freeing the hulls and sticks which are thrown off by centrifugal force onto the slide 48. Cotton clinging to the teeth of the saw 32 is doffed by the doffing brush 49 and falls downwardly through the casing onto the cleaning cylinders 51 to be finally discharged at 55.

The material passing down the slide 48 is delivered by the slide 52 to the second saw cylinder 53, having associated therewith the stripper roller 54, the hull board 56, the reclaiming cylinder 58, and the second wire brush 62, all as described in connection with the first unit and in which the sticks, hulls and cotton clinging thereto are subjected to a treatment similar to that already described. The hulls and sticks from the reclaiming cylinder 37 are delivered to the conveyor 61 for final disposal. Hulls and sticks thrown off by centrifugal force from the saw cylinder 53 are thrown into the trough 64 of the screw conveyor 66 which, in turn, delivers them to the reclaiming cylinder 58. From the reclaiming cylinder 58, the hulls and sticks are delivered through the opening 69 into the trough 59 of the conveyor 61 for final disposal. Cotton doffed by the doffing brush 63 falls downwardly through the casing onto the final cleaning cylinders 51.

From the foregoing it will be apparent that I have devised apparatus which is effective for extracting hulls and sticks and other foreign material from the seed cotton which is simple in design and operation and which is effective to make the extraction without the necessity of reducing the hulls and sticks to fine particles. By this means, it will be seen that I am enabled to provide cleaner cotton affording a better sample than has heretofore been possible.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a seed cotton hull extractor including a cleaning saw cylinder disposed to rotate about a horizontal axis, means to feed seed cotton containing coarse and fine foreign particles to the up-going side of the saw cylinder to be carried around thereby, a stripper roller mounted over the saw cylinder and rotating in a direction to knock large particles of foreign material back from the saw cylinder, means to press the cotton passing the stripper roll down onto the saw cylinder and permitting the passage of foreign material clinging to the cotton, a downwardly sloping slide mounted along the down going side of the saw cylinder to receive large particles of material thrown off by centrifugal force from the saw cylinder, means mounted alongside the saw cylinder below the slide to doff the cotton from the saw cylinder, a second rotary cleaning saw cylinder disposed to receive on its upgoing side the material moving down the slide, a second stripper roller mounted over the second saw cylinder, means to press the cotton passing the second stripper roller down on the second saw cylinder and permitting the passage of foreign material clinging to the cotton, a conveyor disposed to receive foreign material thrown off by centrifugal force from the second saw cylinder, a spiked reclaiming roller associated with each of the saw cylinders and disposed to bring foreign material into final engagement with the saw cylinders, means to convey foreign material thrown off by by the saw cylinders to their respective associated reclaiming rollers for final treatment, and means to discharge foreign material from the reclaiming rollers.

2. In apparatus for treating seed cotton, containing foreign such as bolls and sticks the combination with cleaning apparatus including a boll breaker, of a saw cylinder disposed to rotate about a horizontal axis, means to feed cotton containing foreign material from the cleaning apparatus to the upgoing side of the saw cylinder, a stripper roller mounted above the saw cylinder and cooperating therewith, to knock back foreign material clinging to the cotton, a wire brush mounted over and bearing against the saw cylinder in position to press the cotton passing the stripper roller downwardly against the saw cylinder, means to reclaim cotton from the foreign material knocked back by the stripper roller, a downwardly inclined slide disposed adjacent the downgoing side of the saw cylinder to receive foreign material with cotton clinging thereto thrown off by centrifugal force from the saw cylinder, means disposed below the side to doff cotton from the saw cylinder, a second saw cylinder disposed at a lower level than the first saw cylinder to receive on its upgoing side the foreign material from the slide, a stripper roller and a doffer associated with the second saw cylinder, a second wire brush mounted over the second saw cylinder between the stripper roller and the doffer and disposed to presss cotton downwardly against the saw cylinder and means to disposed of foreign material thrown off by centrifugal force from the second saw cylinder.

References Cited in the file of this patent

UNITED STATES PATENTS

| | | |
|---|---|---|
| 1,310,304 | Simmons | July 15, 1919 |
| 1,656,398 | Smith | Jan. 17, 1928 |
| 2,100,302 | Mitchell | Nov. 23, 1937 |
| 2,668,989 | Vandergriff | Feb. 16, 1954 |
| 2,712,673 | Wallace | July 12, 1955 |